United States Patent [19]
Smith

[11] 3,731,086
[45] May 1, 1973

[54] RAILROAD VEHICLE CONTROL SYSTEM

[75] Inventor: Willis R. Smith, Rochester, N.Y.

[73] Assignee: General Signal Corporation, Rochester, N.Y.

[22] Filed: Oct. 15, 1971

[21] Appl. No.: 189,731

Related U.S. Application Data

[63] Continuation of Ser. No. 14,909, Feb. 27, 1970.

[52] U.S. Cl. .................246/63 C, 179/82, 246/182 C
[51] Int. Cl. ..............................................B61l 3/18
[58] Field of Search.....................246/187 B, 63 C, 246/63 R, 4, 3, 2, 182 C, 182 R; 235/153 AE; 340/146.1 BE, 152 T; 179/82

[56] References Cited

UNITED STATES PATENTS

| | | | |
|---|---|---|---|
| 3,268,727 | 8/1966 | Shepard | 246/187 B |
| 3,045,112 | 7/1962 | Hailes | 246/187 B |
| 3,348,197 | 10/1967 | Akers, Jr. et al. | 235/153 AE |
| 3,676,669 | 7/1972 | Jauquet | 246/63 C |

Primary Examiner—Gerald M. Forlenza
Assistant Examiner—George H. Libman
Attorney—Harold S. Wynn and Milton E. Kleiman

[57] ABSTRACT

A railroad vehicle control system governed by a wayside computer has a communications channel for each track section in the territory for periodically exchanging information between said computer and said railroad vehicle wherein the improvement comprises a tachometer means governed by the rate of rotation of the wheels of said vehicle for producing pulses indicative of the actual speed in accordance with said rate of rotation. The computer includes a control stage for calculating speed, and generating desired speed control signal pulses for transmission to the vehicle and a checking stage responsive to said control stage for validating the desired speed signal. A standby stage responsive to the control and checking stages assumes control and checking functions upon failure of either of said stages. A comparator responsive to the control and actual speed pulses increases and decreases the speed of the vehicle until the frequency of the actual speed pulses equals the frequency of desired speed pulses.

7 Claims, 3 Drawing Figures

Patented May 1, 1973

RAILROAD VEHICLE CONTROL SYSTEM

This is a continuation, of application Ser. No. 14,909 filed 2/27/70.

BACKGROUND OF INVENTION

This invention relates to railroad vehicle speed control systems and more particularly to a control system for a railroad vehicle governed by a computer over a specified length of track territory.

In railroad vehicle control systems a specially designed limited purpose computer may be incorporated for controlling the track territory under consideration. The functions of these computers are often times limited to the specific requirements of the particular installation and as such do not provide a great deal of flexibility for expansion of the system for auxiliary controls. As a matter of fact, the computer controlling the vehicles over track circuits and the like may not have additional apparatus for checking or standby because of the complexity and expense required by such duplication. A failure of the main computer will necessarily result in a track territory without signals which is obviously a hazardous situation. Besides the danger involved in an inoperative signaling system, the traffic using that territory is necessary delayed until the computer is brought back into operation or possibly slower acting manual controls are used to communicate with the vehicles in the section.

Track circuits have also presented certain problems in these signaling systems in that a failure of an insulated joint or high frequency bypass apparatus which separates one track section from another would also interfere with the efficient operation of the signaling system.

In addition to these problems, auxiliary controls such as highway warning crossing devices and switches require separate track circuits for their actuation and field located apparatus for determining the time for energizing these devices. Many of these systems have their own special purpose apparatus for controlling the warning signals and as such as rather independent of the surrounding systems. This independence which these auxiliary systems possess often adds nothing in the way of safety to the system and also provides for unnecessary duplication of function along the territory.

It is therefore an object of the present invention to provide an arrangement which substantially obviates one or more of the limitations and disadvantages of the described prior arrangements.

It is another object of the present invention to provide a computer controlled railroad vehicle control system having checking and standby functions for eliminating delays and danger provided by a signal failure.

It is another object of the present invention to provide a system which will actuate auxiliary devices from a central location.

It is still another object of the present invention to provide a control system wherein train carried apparatus responding to computer signals from the central location controls the vehicle in accordance with said computer signals.

It is another object of the present invention to provide a system for communicating to and from a railroad vehicle without the use of track circuits.

SUMMARY OF INVENTION

There has been provided a railroad vehicle control system governed by a wayside computer. This system has a channel for each track section in the territory for periodically exchanging information between said computer and the railroad vehicle and the improvement comprises tachometer means governed by the rate of rotation of the wheels of said vehicle for producing pulses indicative of the actual speed in accordance with said rate of rotation. The computer includes a control stage for calculating the desired speed and generating the desired speed and acceleration control signal pulses for transmission to the vehicle, a checking stage responsive to said control stage for validating a desired speed signal, and a standby stage responsive to the control and checking stage for assuming control and checking functions upon failure of either of said stages. Comparator means carried on the vehicle responsive to the control and actual speed pulses increases and decreases speed of the vehicle until a frequency signal of the actual speed pulses equals the frequency of the desired speed pulses.

For a better understanding of the present invention together with other and further objects thereof, reference is had to the following description taken in connection with the accompanying drawings while its scope will be pointed out in the appended claims.

DESCRIPTION OF THE PREFERRED EMBODIMENT

The configuration of the present invention contemplates the use of a computer for automatically controlling signaling systems, switching and speed control along a predetermined section of railroad right of way. A main computer A governed by a master program generates output signals for the control of the wayside apparatus such as switch 20, train length detector 22, and speed control communication loops 30A, B and C. The computer input-output I/O is coupled to these various devices over dedicated transmission lines to each of the devices. This has been chosen in order to provide safety to the system. It is also apparent that the use of dedicated lines obviates the necessity for complex coding and decoding apparatus which would be required if a single communications line were used with several inputs from the various devices. The computer I/O is parallel in configuration and therefore each wayside device is identified by its particular input to the computer A.

In order to control the speed of a railroad vehicle in control loop 30A, an output signal from control computer A is transmitted over line 3A to primary transmitting coil 31A. This is inductively coupled with loop coil 30A through transformer coil 33A. The signal from computer A over line 3A is a frequency shift carrier signal having three states; high, low or center frequency which correspond to (+), (−) and off respectively.

Figure 1:
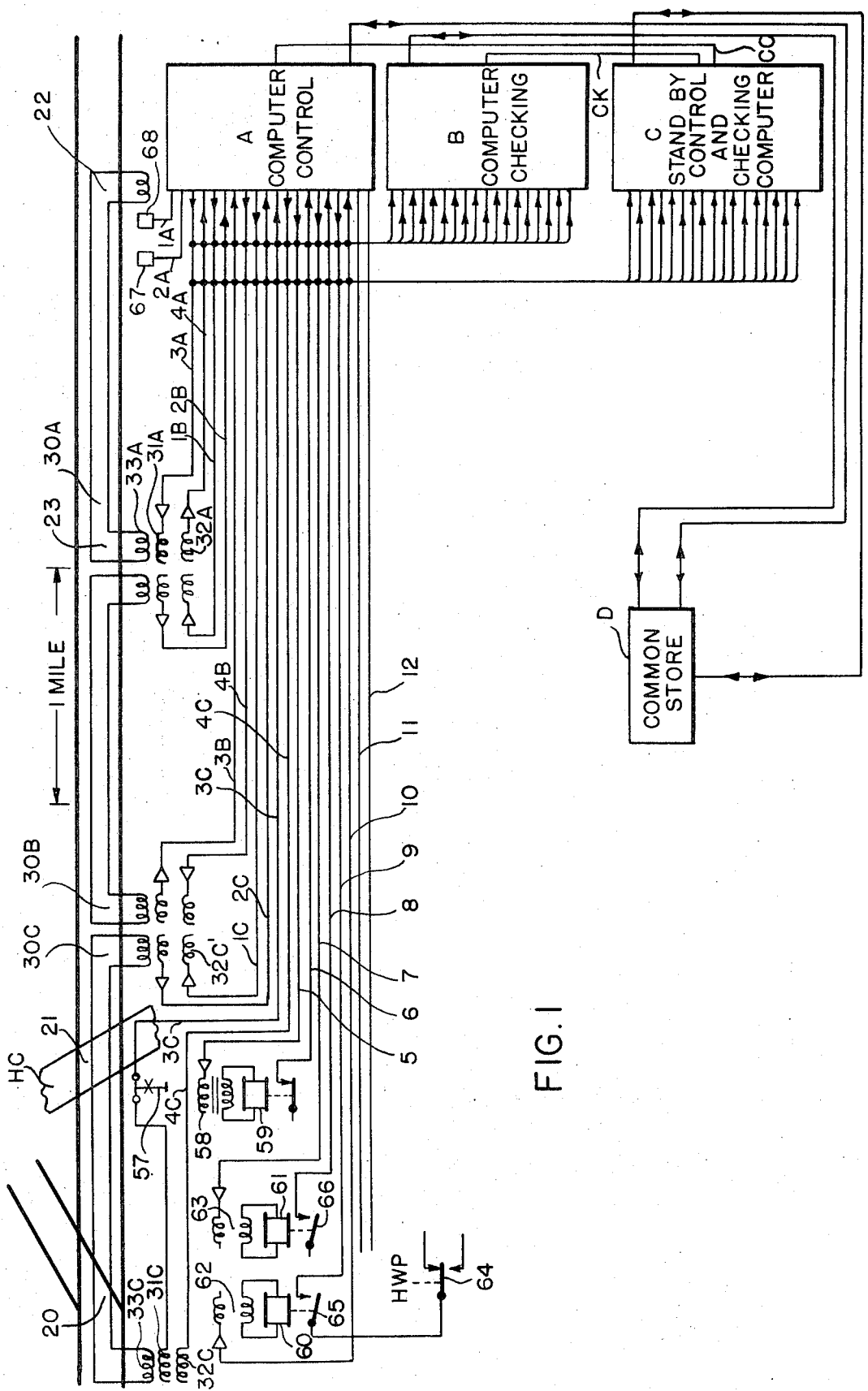
FIG. 1 is a drawing in block form illustrating the computer control and communications channel to the railroad vehicle.
Figure 2:
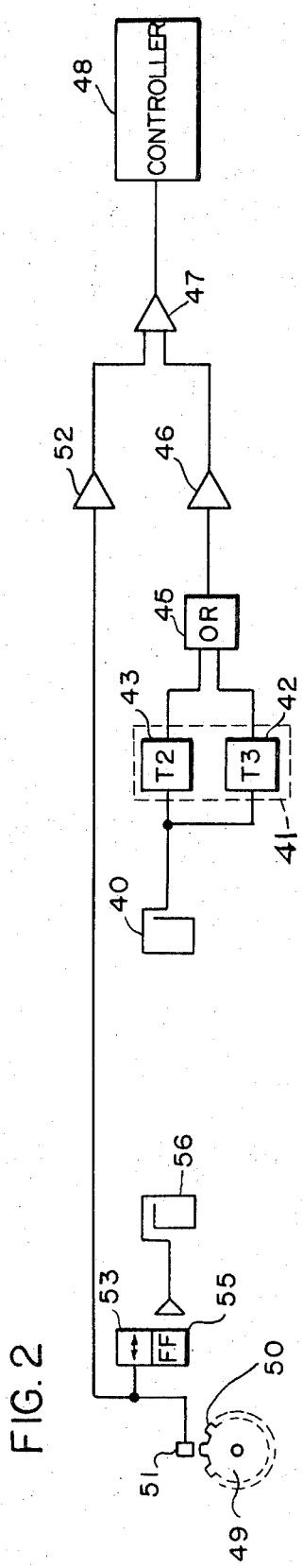
FIG. 2 is a drawing showing the train carried apparatus for controlling the speed of the vehicle in accordance with the computer signals.

In FIG. 2 the carrier frequency transmitted from control computer A is received inductively from loop 30A by receiving loop 40A. This signal is coupled to direction control 41 which includes filters 42 and 43. These filters detect whether the frequency shift from the carrier frequency is positive or negative; and according to the present invention, filter 43 detects a positive shift indicating a forward direction and filter 42 detects negative-going pulses indicating a reverse desired speed. Forward being in the direction from left to right in the drawing. The speed pulses are transmitted through OR gate 45 and command speed gate 46 to comparator 47 for transmission to vehicle propulsion and braking controller 48.

The vehicle contains an electromechanical tachometer for generating signals of actual speed for comparison in comparator 47. This tachometer includes an axle generator 49 having teeth thereon 50 and magnetic pick up 51 for detecting the passage of the axle teeth. Pulses generated by the interaction of the teeth 50 and magnetic pick up 51 are transmitted to the actual speed gate 52 and thence to the comparator 47. If the signals from demand speed gate 46 exceed actual speed pulses, then comparator 47 generates a signal indicating an increase in speed. The rate of increase or decrease of the demand speed pulse provides an acceleration or deceleration proper for attaining the desired speed. However, if the actual speed pulses lead the demand speed pulses then the comparator generates a signal for slowing down the vehicle for transmission to vehicle propulsion and braking controller 48. The signals from magnetic pick up 51 are also coupled to direction logic 53 which is similar in nature to the direction control 41 in that it transmits a directional output to flip-flop 55 which is coupled to transmitting loop 56. This transmitting loop generates a signal corresponding to the actual speed of the vehicle and this is magnetically coupled to loop 30A and transmitted back to the computer over coil 33A and secondary receiving coil 32A, thence to wire 4A to the computer A.

The information received by computer A and other vital data required in the automatic control of railroad vehicles is stored in common storage area D. This common storage area has inputs and outputs to computers A, B and C and is capable of supplying information necessary for specific functions of these computers upon demand. The I/O of computer A is directly coupled to the I/O's of computer B and C. Information received by computer A is analyzed by computer B and the resulting signals generated by computer A are received and compared by computer B with the available information for checking the operability of computer A. Computer C is used for a standby control and checking computer. It is capable of generating control signals and checking the operability of computer A. If the signals generated by the control computer A are not in agreement with the results derived by checking computer B, it is apparent that one of the two computers A or B is malfunctioning. Under these circumstances, standby computer C is activated and if the results of computer A and C are in agreement, computer B is deactivated and standby computer C assumes the function formerly handled by computer B. In the event that the standby computer agrees with the results of computer B, then A is deactivated and computer C controls the operation of the railroad section under consideration. The leads CK and CC coupled from computer C to computer B and A respectively are energized for inhibit signals to those computers when C assumes control of the particular function.

Control of track sections 30C and 30B are similarly coupled over lines 1B, 2B, 3B, 4B and 1C, 2C respectively. The computer A having information concerning each block in the system can maintain headways and control the speed of the train very accurately because it is in constant communication with each of the sections in the right of way and has information relative to the various functions of the vehicles within the track section. When, for example, a vehicle is travelling from left to right in the drawing in block 30C, the position of the train as it enters the block 30C is detected by the extreme coil 33C. Vehicle occupancy is then transmitted over secondary receiver 31C and wire 3C to computer A. In addition, the transmitting loop 56 generates a signal corresponding to the actual speed of the vehicle. If necessary, a signal from computer A over line 1C to primary transformer coil 32C' is generated for adjusting the desired speed of the vehicle. However, assuming no change in speed is necessary, the speed of the vehicle is known and the time necessary for the vehicle to reach the highway crossing HC is determined because it is assumed that the computer program has this fixed data stored in common storage D. Knowing the speed of the vehicle and its position, the highway crossing warning 57 may be actuated in a uniform time before the vehicle reaches the crossing. This is accomplished by transmitting a signal for computer A over wire 5 to transformer 58 for deenergizing relay 59. The deenergization of a relay for activating a highway crossing signal is known in the art as a conventional way of providing fail-safe operation to highway crossing apparatus.

The actuation of switch 20 may be accomplished through relays 60 and 61 by activation of normal and reverse transformers 62 and 63 respectively. These are in turn activated over lines 11 and 7 respectively from computer A. Since the position of the vehicle and its speed are calculated from inputs from loop C, switch 20 may be actuated to a position as required by the particular situation. Contactors 55 and 56 of relays 60 and 61 respectively are actuated in accordance with signals transmitted to the relays over transformers 62 and 63 and provide a signal to the computer over wires 9 and 8 respectively that the desired relay has been activated. Contactor 65 checks in this embodiment the activation of the switch 20 to the normal position which is essential for safe main line train operation. The contactor 65 is controlled by apparatus at the switch which detects the position of the railroad switch points in switch 20. If a normal position is called for, then and it is not detected; that is, if contactor 65 is not closed to the forward position, then signals transmitted to wayside equipment for stopping the train are put in effect. The only way a train may move is in response to signals from the wayside and an absence of the signals would, by virtue of the logic, require a stop.

Figure 2A:
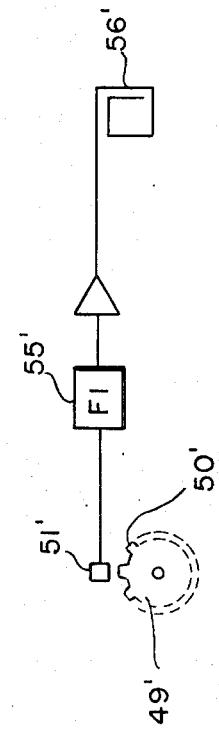
FIG. 2A is a device for providing redundancy and train length information to the computer.

Train length may be accomplished by a number of methods of this embodiment. The FIG. 2A shows a second tachometer system which consists of an axle 49', 50' and magnetic pick up 51'. The teeth 51' activate the magnetic pick up and as it rotates produces pulses to activate flip-flop 55' to which is coupled rear end transmitting loop 56'. As the train enters, for example, block A from the left, the front end transmitting loop 56 provides an indication of vehicle presence to computer A. The computer also receives information as to the speed of the vehicle from the inputs as previously described and when the rear end of the train enters the block A, another signal is transmitted over transmitting loop 56'. This gives indication of the vehicle length in terms of the time elapsed since the entry of loop 56 in block A, and the speed of the vehicle. In addition, this second tachometer of FIG. 2A also provides redundance of speed information to the computer for checking the accuracy of the system. A second train length detector has been incorporated in the case where a tachometer is shown in FIG. 2A is not present at the rear of the train. The sensors 67 and 68 may be photo-cells or other detector equipment known in the art which provide signals to the input of computer A for determining the length of the train.

If computer A is incapable of handling more than a certain number of inputs at one time interval, the wayside blocks 30A, B and C may be repeated along the right of way, and a scan of various sections of the right of way may be accomplished. However, it is contemplated that all the necessary information for controlling the right of way over a distance of perhaps 100 miles or more may be handled by a signal control computer A, and the checking and standby computers B and C respectively.

There has therefore been provided a railroad vehicle control system governed by a wayside computer obviating the limitations previously discussed and providing self-checking, elimination of track circuits and track bondings and accurate speed control.

The system also provides for an extremely high amount of flexibility in that it can control a number of wayside signaling devices such as switches and warning signals without the necessity of complicated wayside apparatus.

The system described provides safety to each aspect of the functions provided because it is a dynamic system. There is continuous exchange of information between the computer and the various wayside devices and the absence of signal indicates a dangerous condition.

While there has been described what at present is considered to be the preferred embodiment of the present invention, it will be obvious to those skilled in the art that various changes and modifications may be made therein without departing from the invention and it is therefore aimed in the appending claims, to cover all such changes and modifications that fall within the true spirit and scope of the invention.

What is claimed is:

1. A railroad vehicle control system governed by a wayside computer having an input-output channel for each track section in the territory for continuously exchanging information between the computer and a train including at least one railroad vehicle wherein the improvement comprises:

a. a plurality of closed loop circuits laid end-to-end along a track, each of said closed loop circuits having a receiving coil at one end of a track section and a transmitting coil at the other end of the track section for exchanging signals between a railway vehicle within the section and the wayside computer;
   b. a pulse receiving means for receiving signals transmitting from the wayside computer through the transmitting coil of one of said closed loop circuits to the railroad vehicle and extracting from such signals a plurality of pulses, the frequency of such pulses indicative of a desired railroad vehicle speed calculated by the wayside computer;
   c. a tachometer means governed by the rate of rotation of the wheels of said vehicle for producing a plurality of pulses, the frequency of such pulses indicative of actual speed of the railroad vehicle; and
   d. a comparator means responsive to the plurality of pulses indicative to the desired vehicle speed and responsive to the plurality of pulses indicative of the actual speed of the railroad vehicle for increasing and decreasing the speed of the vehicle until the frequency of the actual speed pulses equals the frequency of the desired speed pulses.

2. The control system of claim 1 wherein the pulses indicative of the actual speed of the railroad vehicle are transferred through the receiving coil of one of the closed loop circuits to the wayside computer for providing to the wayside computer feedback indications of the railroad vehicle's response to the desired speed signals from the wayside computer.

3. The control system of claim 2 wherein the transmitting coil for transferring signals to the railroad vehicle from the computer and the receiver coil for transferring signals to the computer from the railroad vehicles are in the same track section as the railroad vehicle and part of the same closed loop circuit.

4. The control system of claim 1 wherein said tachometer means includes a first tachometer means operative on a first railroad vehicle at the front end of the train and a second tachometer means operative on a last railroad vehicle at the rear end of the train for providing signals from said first and second tachometer means to the computer when the first vehicle and the last vehicle enter each track section.

5. A railroad vehicle control system for automatically controlling the monitoring the travel of a railroad vehicle along a plurality of track sections, wherein the improvement comprises:

a. wayside computing means having an input-output channel for each track section for continuously exchanging information between said computer means and the railroad vehicle;
   b. a plurality of closed loop circuits laid end-to-end along a track, each of said closed loop circuits having a receiving coil at one end of a track section and a transmitting coil at the other end of the track section for exchanging signals between a railway vehicle within the section and said wayside computing means;
   c. pulse receiving means for receiving signals transmitted from said wayside computing means through the transmitting coil of one of said closed loop circuits to the railroad vehicle and extracting from such signals a plurality of pulses, the frequency of such pulses indicative of a desired railroad vehicle speed calculated by said wayside computing means;

d. tachometer means governed by the rate of rotation of the wheels of said vehicle for producing a plurality of pulses, the frequency of such pulses indicative of actual speed of the railroad vehicle; and e. comparator means responsive to the plurality of pulses indicative of the desired vehicle speed and responsive to the plurality of pulses indicative of the actual speed of the railroad vehicle for increasing and decreasing the speed of the vehicle until the frequency of the actual speed pulses equals the frequency of the desired speed pulses.

6. The control system of claim 5 wherein said wayside computing means includes a first, second, and third computing means having common inputs and outputs, said first computing means calculating the desired railroad vehicle speed and outputting corresponding desired speed control signals for transfer to the railroad vehicle, said second computing means responsive to said first computing means to validate and to invalidate the outputted desired speed control signals, and said third computing means responsive to said second computer means for assuming the calculating and outputting functions of said first computing means when said second computer means invalidates the outputted desired speed control signals from the first computing means.

7. The control system of claim 6 wherein said wayside computing means include a data storage area having inputs and outputs to each of said first, second and third computing means for providing data storage common to each of said computing means.

* * * * *